US008978965B2

(12) United States Patent
Longyear

(10) Patent No.: US 8,978,965 B2
(45) Date of Patent: Mar. 17, 2015

(54) SPRING CYCLE COUNTER

(76) Inventor: Jeff Longyear, Port Byron, NY (US)

( * ) Notice: Subject to any disclaimer, the term of this patent is extended or adjusted under 35 U.S.C. 154(b) by 223 days.

(21) Appl. No.: 13/603,969

(22) Filed: Sep. 5, 2012

(65) Prior Publication Data

US 2012/0325917 A1 Dec. 27, 2012

Related U.S. Application Data

(63) Continuation-in-part of application No. 12/835,992, filed on Jul. 14, 2010, now abandoned.

(51) Int. Cl.

| | |
|---|---|
| ***G06M 1/04*** | (2006.01) |
| ***G06M 1/08*** | (2006.01) |
| ***G06K 7/10*** | (2006.01) |
| ***G06K 7/14*** | (2006.01) |

(Continued)

(52) U.S. Cl.

CPC ....... *E05D 13/1269* (2013.01); *E05Y 2201/484* (2013.01); *E05Y 2400/82* (2013.01); *E05Y 2800/404* (2013.01); *E05Y 2400/10* (2013.01); *E05F 15/00* (2013.01); *E05Y 2800/00* (2013.01); *E05Y 2900/132* (2013.01)

USPC ........................................ 235/91 R; 235/454

(58) Field of Classification Search

CPC ................ G07C 9/00182; G07C 2009/00928; G07C 2009/00253; G07C 2209/62; G07C 2009/00785; G07C 2009/0092; G07C 2209/08; G07C 9/00174; G07C 9/00912; G07C 2209/64; G07C 9/00; G07C 9/00682; E05Y 2900/106; E05Y 2800/00; E05Y 2201/656; E05Y 2201/668; E05Y 2400/80; E05Y 2900/132; E05Y 2201/22; G05D 2201/0213; G07F 19/0092; G07F 9/026; G07F 11/002; G07F 17/12; G07F 7/00; G07F 11/42; G07F 11/46; G07F 11/62; G07F 11/00; G07F 11/54; G07F 1/046; G07F 5/18; G07F 9/06; G07F 11/165; G07F 11/36; G07F 11/70; G07F 11/10; G07F 11/24

USPC .......... 235/91 R; 340/426.23; 318/266; 49/31

See application file for complete search history.

(56) References Cited

U.S. PATENT DOCUMENTS

| | | | | |
|---|---|---|---|---|
| 4,038,620 | A * | 7/1977 | Shlesinger et al. | 335/153 |
| 5,006,697 | A | 4/1991 | Amis et al. | |

(Continued)

FOREIGN PATENT DOCUMENTS

| | | | |
|---|---|---|---|
| DE | 2602873 | A1 | 7/1977 |
| JP | 8060957 | A | 3/1996 |

OTHER PUBLICATIONS

Chamberlain Professional Products. "Non-Resettable Counter Modification" Jul. 2008.

*Primary Examiner* — Thien T Mai

(74) *Attorney, Agent, or Firm* — Brown & Michaels, PC

(57) ABSTRACT

A spring cycle tracker system for a door mounted on a track having at least one spring, with the door having an open and closed position. The system has at least one sensed element and a tracker. The tracker has a sensor having at least one sensing element; and a controller having a counter, at least one input signal from the at least one sensing element and at least one output signal. The sensed element and the tracker are mounted such that when the door is moved towards the open position and/or the closed position, the sensed element and the controller are moved adjacent to each other so that the sensing element senses the sensed element, sending an input signal to the controller, incrementing the counter, tracking a number of times the spring is used.

13 Claims, 4 Drawing Sheets

(51) Int. Cl.
*E05D 13/00* (2006.01)
*E05F 15/00* (2006.01)

(56) References Cited

U.S. PATENT DOCUMENTS

| | | | | |
|---|---|---|---|---|
| 5,625,338 | A | 4/1997 | Pildner et al. | |
| 6,318,024 | B1 | 11/2001 | Krsnak et al. | |
| 6,326,751 | B1 * | 12/2001 | Mullet et al. | 318/434 |
| 2004/0257198 | A1 | 12/2004 | Mullet et al. | |
| 2005/0022451 | A1 * | 2/2005 | Fitzgibbon et al. | 49/31 |
| 2005/0224700 | A1 | 10/2005 | Petra | |
| 2005/0253710 | A1 | 11/2005 | Eskildsen | |
| 2008/0047350 | A1 | 2/2008 | Atlas et al. | |
| 2009/0002143 | A1 * | 1/2009 | Haber | 340/426.23 |
| 2009/0027199 | A1 | 1/2009 | DiPoala | |
| 2011/0032073 | A1 | 2/2011 | Mullet et al. | |

* cited by examiner

SPRING CYCLE COUNTER

REFERENCE TO RELATED APPLICATIONS

This application is a continuation-in-part of copending parent patent application Ser. No. 12/835,992, filed Jul. 14, 2010, entitled "DOOR CYCLE TRACKER". The aforementioned application is hereby incorporated herein by reference.

BACKGROUND OF THE INVENTION

1. Field of the Invention

The invention pertains to the field of spring cycle trackers. More particularly, the invention pertains to a spring cycle tracker for an overhead door.

2. Description of Related Art

Many residential homes and businesses use overhead doors. Springs are used to aid in opening and closing overhead doors. The springs are very tightly tensioned. Most springs used with overhead doors have a life of about 10,000 cycles or about 10 years of normal use, with each spring cycle being equal to one opening and one closing of an overhead door or a door cycle. A breaking spring that is not properly contained may lash out and strike people and or damage property. Currently, there is no way track the life cycle of the spring so that the springs can be properly replaced prior to them breaking and possible injuring people and property.

SUMMARY OF THE INVENTION

A spring cycle tracker system for a door mounted on a track having at least one spring and the door having an open and closed position. The system has at least one sensed element and a tracker. The tracker has a sensor having at least one sensing element; and a controller having a counter, at least one input signal from the at least one sensing element and at least one output signal. The sensed element and the tracker are mounted such that when the door is moved towards the open position and/or the closed position, the sensed element and the controller are moved adjacent to each other so that the sensing element senses the sensed element, sending an input signal to the controller, incrementing the counter, tracking a number of times the spring is used. The sensed element and the tracker are mounted at a height greater than 50% of the total height of the door when the door is in the closed position.

DETAILED DESCRIPTION OF THE INVENTION

Figure 1:
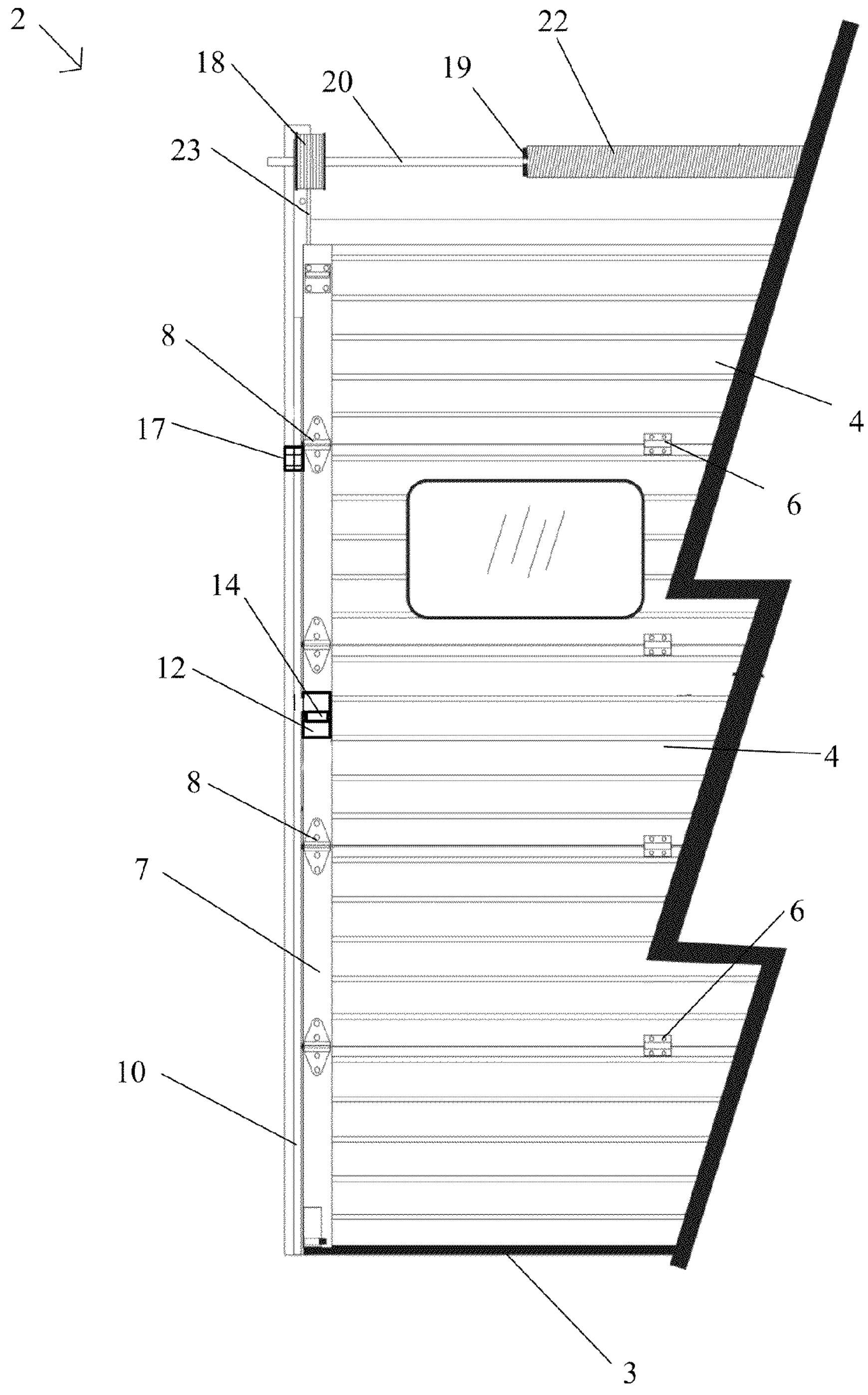
FIG. 1 shows a section of an interior elevation of a sectional overhead door in a closed position.
Figure 2:
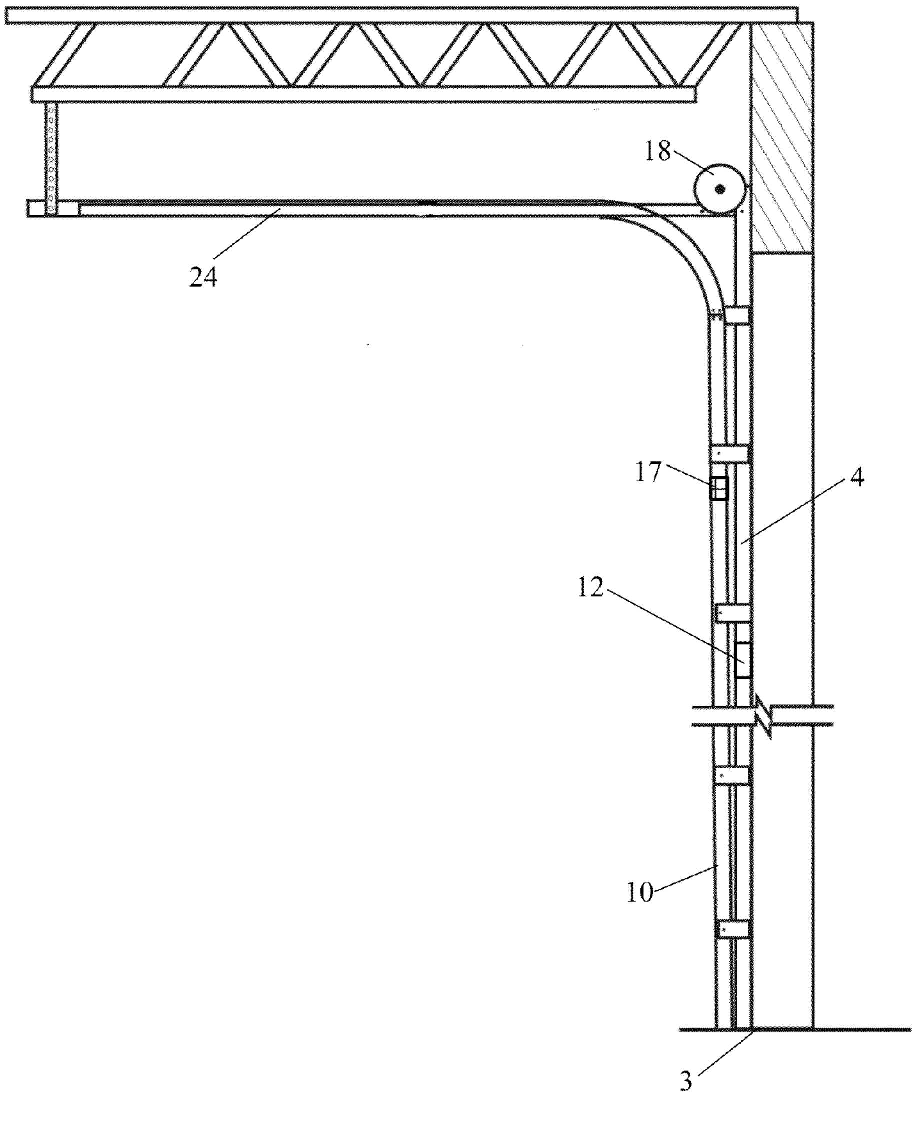
FIG. 2 shows a side view of the interior of a sectional overhead door in a closed position.

FIGS. 1-2 show an overhead door 2 in the closed position with a cycle tracker 12 of the present invention. The overhead door 2 includes a series of sections 4 that are connected to each other by hinges 8 near the outer edge 7 of the door and another set of hinges 6 between the sections 4 and the outer edges 7. It should be noted that only one set of hinges 8 on the outer edge 7 and one set of hinges 6 between the outer edges 7 are shown in FIG. 1. Additional hinges may be present.

Above the overhead door is mounted a torsion spring counterbalance system. The torsion spring counter balance system includes a torsion spring 22 on a torsion shaft 20 mounted over the overhead door with a winding cone 19 on one end and a stationary cone (not shown) at the other end. At the ends of the torsion shaft 20 are cable drums 18. Counterbalance cables 23 run from the vertical tracks at the bottom corners of the door to the cable drums 18.

The outer edges 7 of the sections 4 of the overhead door 2 are mounted on a vertical track 10. The vertical track 10 transitions into a horizontal track 24 as shown in FIG. 2. In one embodiment, attached to the vertical track 10 of the overhead door 2 is reflective tape 17 or some other type of reflective material. Attached to an outer edge 7 of one of the sections 4 of the overhead door is a cycle tracker 12. The cycle tracker 12 tracks the number of door cycles or spring cycles which can be used to predict the remaining life or the remaining number of life cycles of the spring. One spring cycle is equivalent to one door cycle, with each door cycle equal to one opening and closing of an overhead door 2.

By knowing the approximate life cycle of the spring, through tracking the number of times the spring has been used or the number of cycles that have already taken place through the number of door cycles, the remaining life cycle of the spring may be predicted and the torsion spring can be replaced prior to it breaking or snapping, decreasing the possibility of injuring people and property.

An audible alarm of the cycle tracker 12 may sound a warning, indicating when the torsion spring is approaching a certain percentage of life remaining, or may also be set when the number on the counter exceeds a specific number of spring cycles. For example, the alarm may sound a warning if 20% of the life cycle of the spring remains or if the counter exceeds 8000 spring cycles. Additionally, the cycle tracker 12 may also have, either separately or in conjunction with the audible alarm, a visible alarm in the form of a light to indicate when the counter reaches a specific number of spring or door cycles.

Figure 3:
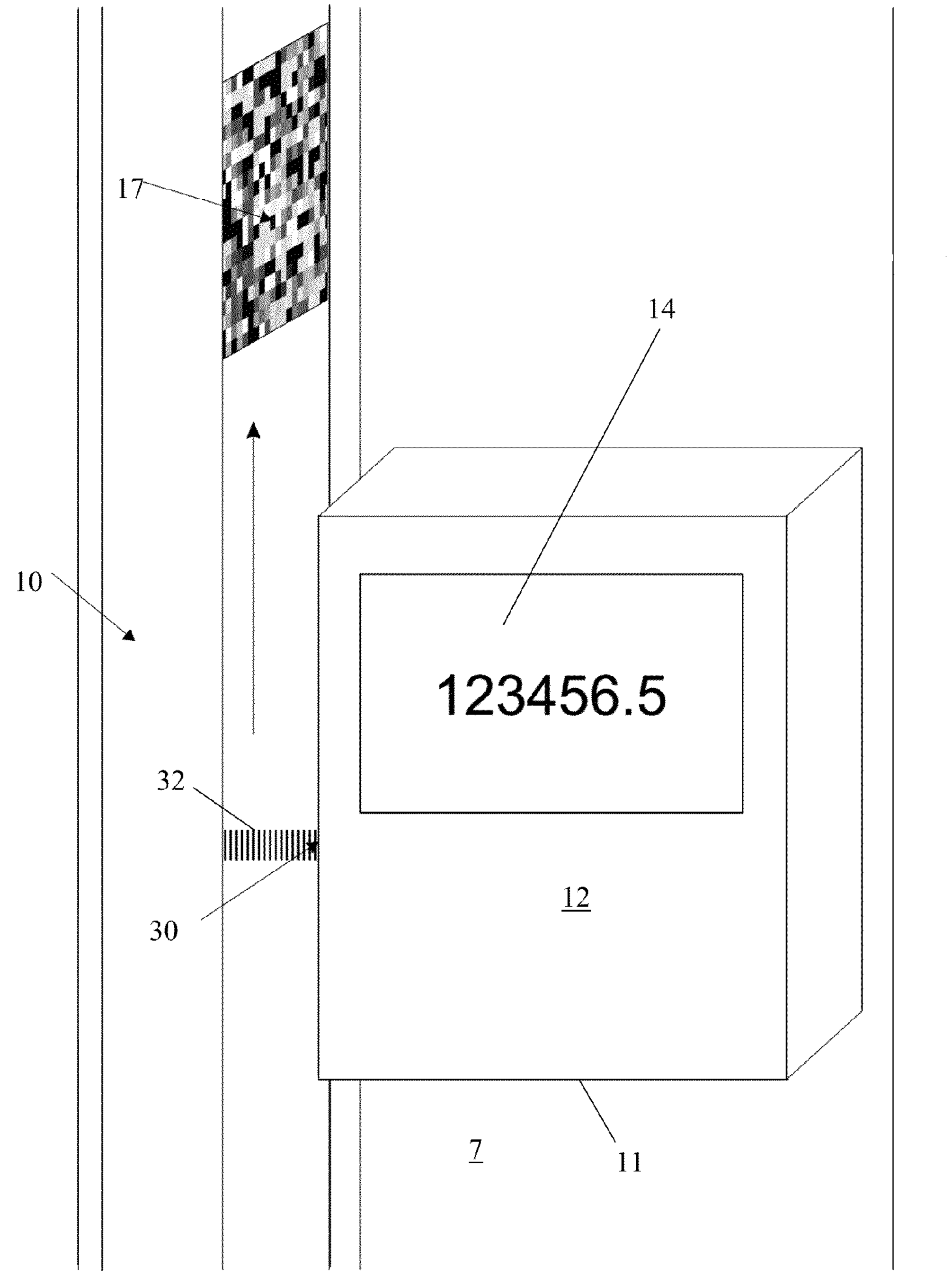
FIG. 3 shows a schematic of the cycle tracker and the overhear door moving towards an open position.

Referring to FIG. 3, the cycle tracker 12 includes a body or plate 11 that is mounted the outer edge 7 of a section 4 of the overhead door 2. A counter 14, which is preferably part of a controller 34, preferably has at least six digits visible and is actuated to increment by the controller 34. The controller 34 is not limited to the inputs and outputs shown within the drawings. The counter 14 is preferably resettable and may be digital.

Figure 4:
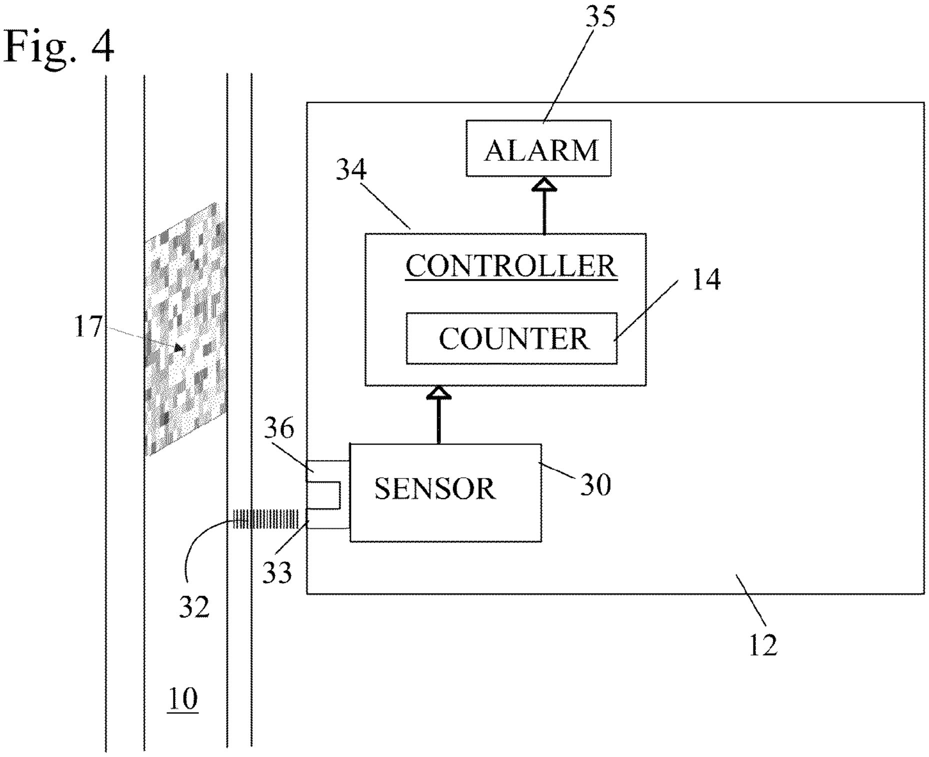
FIG. 4 shows a schematic of a control scheme to actuate the counter of the cycle tracker.

As shown in FIG. 4, within the cycle tracker 12 is a sensor 30 which contains both an emitter 33 and a sensor receiver 36. The sensor 30 may be a diffuse-mode sensor, where light emitted from the sensor strikes the surface of an object to be detected (in this case the reflective tape 17), and is diffused back or sends some light back to the receiver 36. Therefore, the reflective tape 17 is detected when the beam of light 32 hits the reflective tape 17 and reflects back the sensor's transmitted light energy back to the sensor. Other type sensors, such as a retroreflective sensor, divergent-mode sensors, or convergent-mode sensor may also be used.

When the reflective tape 17 is detected, the sensor 30 sends an input signal to a controller 34. The controller 34 increases the counter 14 by 0.5. If the number on the counter 14 exceeds a preset number, the controller 34 sends an output signal to an alarm 35. The alarm 35 may be a visual alarm, an audible alarm or both. Both the alarm 35 and the counter 14 may be resettable.

Looking, then, at a complete door cycle from closed, to open and back to closed, the counter system works as follows:

When the overhead door 2 is raised to an open position, the torsion spring 22 unwinds and the stored tension aids in lifting the sections 4 of the overhead door 2. The wheels on the sections slide inn the vertical track 10 and transition onto the horizontal track 24. The spring 22 takes up the weight as the door moves by turning the shaft 20, thus turning the cable drums 18, wrapping the cables 23 around the cable drums 18.

As the overhead door 2 is moving onto the horizontal track 24, the cycle tracker passes the reflective tape 17. Light emitted from the sensor 30 of the cycle tracker 12 strikes the reflective tape 17, and reflects back the sensor's transmitted light energy back to the sensor 30. The sensor 30 sends an input signal to the controller 34. The controller 34 increases the counter 14 by 0.5. If the number on the counter 14 exceeds a preset number, the controller 34 sends an output signal to an alarm 35.

To close the door from the open position described above, the overhead door 2 is lowered to a closed position in which an edge of one of the sections 4 is in contact with the ground 3. In the closed position the sections 4 of the overhead door 2 are on the vertical track 10. As the door closes, the cables 18 unwrap from the drums 18 and the torsion spring 22 is rewound to full tension.

As the overhead door 2 is moving towards the closed position, the cycle tracker once again passes the reflective tape 17. As it does, light emitted from the sensor 30 of the cycle tracker 12 strikes the reflective tape 17, and reflects back the sensor's transmitted light energy back to the sensor 30. The sensor 30 sends an input signal to a controller 34. The controller 34 increments the counter 14 to increase the counter by 0.5. If the number on the counter 14 exceeds a preset number, the controller 34 sends an output signal to an alarm 35.

Thus for each complete cycle of door opening and door closing, the counter is increased by 0.5 twice—therefore, one complete door cycle of an opening and closing of the door increases the counter by one. One door cycle is equivalent to one spring cycle.

In an alternate embodiment, the cycle tracker may only track when the door is moved to an open position.

The cycle tracker 12 is preferably attached to a section 4 of the overhead door 2 at eye level of a user or greater than 50% of the height of the door when the door is in the closed position.

In another embodiment of the present invention, the spring cycles may be tracked when the door is moving in only one direction (up or down) by placing two separate sensors 30 with two separate sensing or receiving elements 36 at different locations offset from each other. The two receiving elements 36 provide input to a controller 34 within a cycle tracker 12. In other words, two reflective strips 17 horizontally and vertically offset in the door track 10, 24 are sensed, and only counted when a first receiving element of a first sensor detects the reflective material before the second receiving element of a second sensor, indicating that the door is moving in a selected direction. When this occurs, the counter is increased by one by the controller 34.

In another embodiment which would allow the counting to only occur when the door is moving in one direction, the reflective material 17 could be patterned to have non-reflective portions in a specific pattern, such that when a sensor receiver 36 receives transmitted light from the reflective material 17 and the overhead door 2 is moving one way—for example, towards an open position—the sensor 30 would sense light transmitted or reflected in a pattern such as on-off(long)-on-off(short)-on. When overhead door 2 is moving in the other direction—towards a closed position—the light transmitted to the sensor 30 or reflected in a different pattern such as on-off(short)-on-off(long)-on. By being able to determine which way the door is moving, the counter 14 can be incremented either for both opening and closing, or just if the door is moving in one direction, open or closed.

Figure 5:
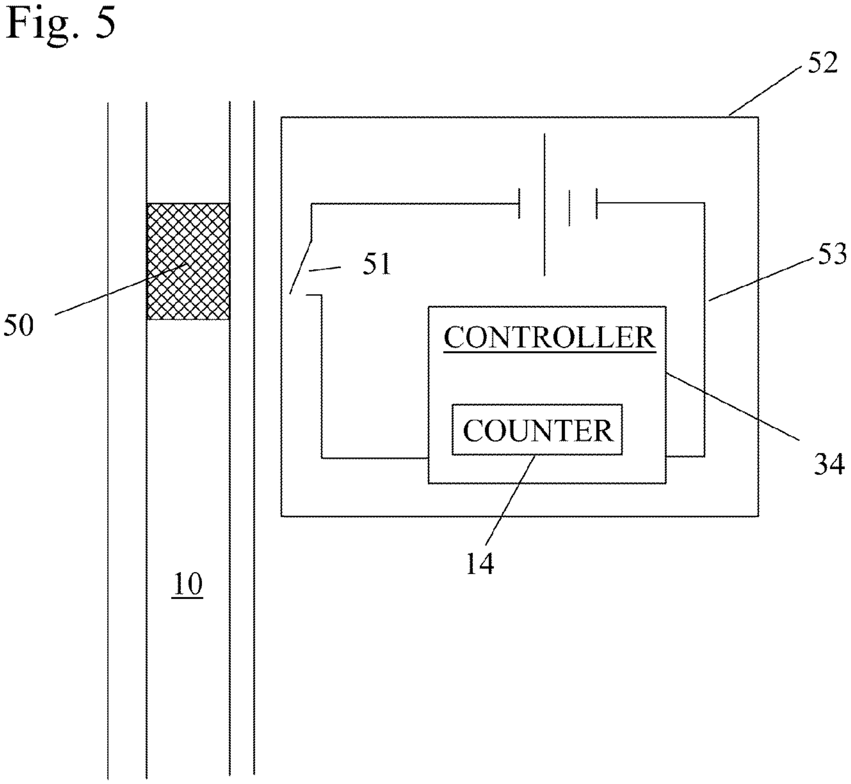
FIG. 5 shows an alternative cycle tracker.

In an alternate embodiment, the reflective material 17 may be replaced by a magnet 50 as shown in FIG. 5. The counter 14 would be actuated when the overhead door 2 approached the magnet 50 and actuated a switch 51 to complete the circuit 53 within the cycle tracker 52. A controller 34 includes a counter 14 to monitor the number of door cycles or spring cycles and send a signal to trigger an alarm.

In another embodiment which would allow the counting to only occur when the door is moving in one direction, magnets 50 may be placed horizontally and vertically offset on each door track at different heights, and the counter 14 is only increased when a first sensor detects the magnet before a second sensor detects the magnet.

While the drawings and the discussion above have the cycle tracker 12 mounted on the overhead door 2 and the sensed element (reflective material 17 or magnet 50) mounted at a fixed location near or to the track, it will be understood that the invention contemplates simply that the two elements be mounted at locations where a moving element (be it the tracker or the sensed element) passes by the fixed element (the other of the sensed element or the tracker). Therefore, the opposite arrangement to that discussed previously is also possible, in which the cycle tracker 12 is mounted to a fixed location adjacent to the door—either on the vertical track 10 or on the horizontal track 24 or at a location adjacent to one of the tracks—and the sensed element is mounted to the moving overhead door 2. In such an arrangement the sensed element (reflective material 17 or magnet 50) would be preferably attached to a section 4 of the overhead door 2 at eye level of a user or greater than 50% of the height of the door when the door is in the closed position.

While a digital counter is described, other types of counters that may be electrically or electronically actuated may also be used.

While the cycle tracker 12 was described and shown in reference to an overhead door 2 with a torsion spring counterbalance system, one skilled in the art could be expected to apply the cycle tracker to an overhead door with extension springs.

While the overhead door was shown as being comprised of segments, the door may also be of the type that lifts in one piece.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A spring cycle tracker system for a door mounted on a track having at least one spring, the door having an open position and closed position, the system comprising:

at least one sensed element of a reflective material comprising a reflective portion and a non-reflective portion;

a spring cycle tracker comprising:

a sensor having at least one sensing element; and a controller having a counter, at least one input signal from the at least one sensing element and at least one output signal;

wherein the sensed element and the spring cycle tracker are mounted such that when the door is moved towards the open position and/or towards the closed position, the sensed element and the controller are moved adjacent to each other so that the sensing element senses the reflective portion and the non-reflective portion of the sensed element, sending an input signal to the controller, incrementing the counter, tracking a number of times the spring is used, and indicating if the door is moving towards the open position or the closed position; and wherein the sensed element and the spring cycle tracker are mounted at a height greater than 50% of the total height of the door when the door is in the closed position.

2. The system of claim 1 in which the spring cycle tracker is mounted to the door, and the sensed element is mounted adjacent to the door.

3. The system of claim 2, in which the sensed element is mounted to the track.

4. The system of claim 2, wherein the spring cycle tracker is mounted to the door at a height greater than 50% of the total height of the door when the door is in the closed position.

5. The system of claim 1 in which the sensed element is mounted to the door, and the spring cycle tracker is mounted adjacent to the door.

6. The system of claim 5, in which the spring cycle tracker is mounted to the track.

7. The system of claim 5, wherein the sensed element is mounted to the door at a height greater than 50% of the total height of the door when the door is in the closed position.

8. The system of claim 1, wherein the sensed element further comprises another reflective material mounted in a first position relative to the reflective portion of the reflective material mounted in a second position on the track; and wherein the spring cycle tracker further comprises a first sensing element sensing the other reflective material and a second sensing element sensing the reflective portion of the reflective material, wherein the counter is increased when the other reflective material is sensed prior to the reflective portion of the reflective material.

9. The system of claim 1, wherein the counter is resettable.

10. The system of claim 1, wherein the spring cycle tracker further comprises an alarm coupled to the controller, wherein the alarm is activated by the controller when the number of cycles on the counter exceeds a selected number.

11. The system of claim 10, wherein the alarm is visual.

12. The system of claim 10, wherein the alarm is audible.

13. The system of claim 10, wherein the alarm is resettable.

* * * * *